United States Patent [19]

Stashko

[11] Patent Number: 4,850,757
[45] Date of Patent: Jul. 25, 1989

[54] ROTARY CUTTING TOOL

[75] Inventor: Daniel R. Stashko, Holly, Mich.

[73] Assignee: GTE Valenite Corporation, Troy, Mich.

[21] Appl. No.: 289,077

[22] Filed: Dec. 23, 1988

[51] Int. Cl.$^4$ .............................................. B23B 51/00
[52] U.S. Cl. ...................................... 408/179; 407/45; 408/181; 408/186; 408/197; 408/199
[58] Field of Search ................... 408/57, 59, 81, 162, 408/163, 153, 181, 179, 185, 186, 173, 199, 200, 231, 233, 197, 713, 185; 407/37, 45

[56] References Cited

U.S. PATENT DOCUMENTS

| | | | |
|---|---|---|---|
| 3,490,315 | 1/1970 | Melchione | 408/153 |
| 3,591,305 | 7/1971 | Aichhorn et al. | 407/45 |
| 4,102,594 | 7/1978 | Kress et al. | 408/197 |
| 4,125,342 | 11/1978 | Kress | 408/185 |
| 4,279,550 | 7/1981 | Kress et al. | 408/197 |
| 4,547,102 | 10/1985 | Millington et al. | 408/185 |

FOREIGN PATENT DOCUMENTS 1435339  5/1976  United Kingdom .............. 408/181

Primary Examiner—Gil Weidenfeld
Assistant Examiner—Daniel W. Howell
Attorney, Agent, or Firm—David J Koris

[57] ABSTRACT

A rotary cutting tool including an elongated generally cylindrical holder having a recess into which is fitted a disposable cutting insert. The insert is held in place by a clamping member which bears against a surface of the insert and which is attached to the holder by a clamping screw. Radial adjustment of the insert can be effected by adjusting screws which have camming surfaces which bear against a corresponding camming surface of the insert. In axial cross section, the axis of each adjustment screw is parallel to the axis of the clamping screw and to a horizontal axis of the holder, and an axis of the insert is at an angle relative to a vertical axis of the holder.

10 Claims, 3 Drawing Sheets

U.S. Patent    Jul. 25, 1989    Sheet 1 of 3    4,850,757
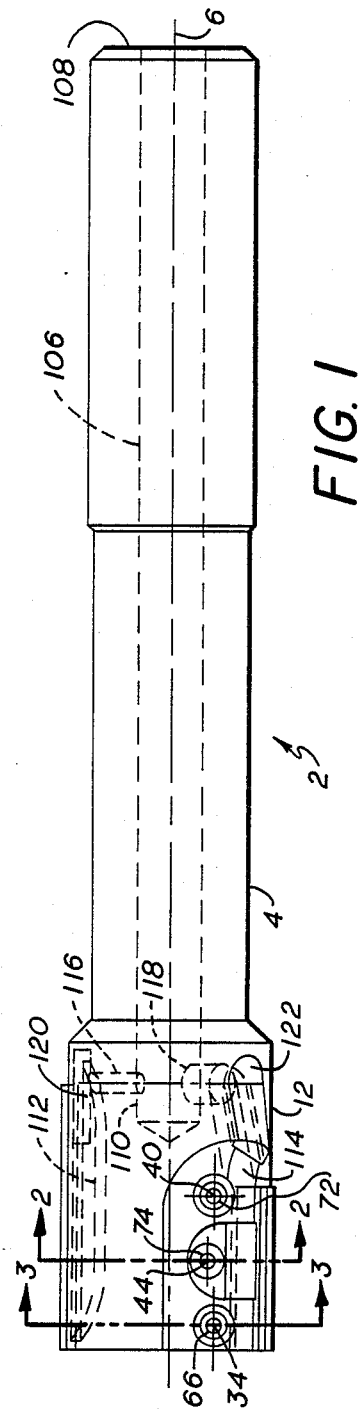
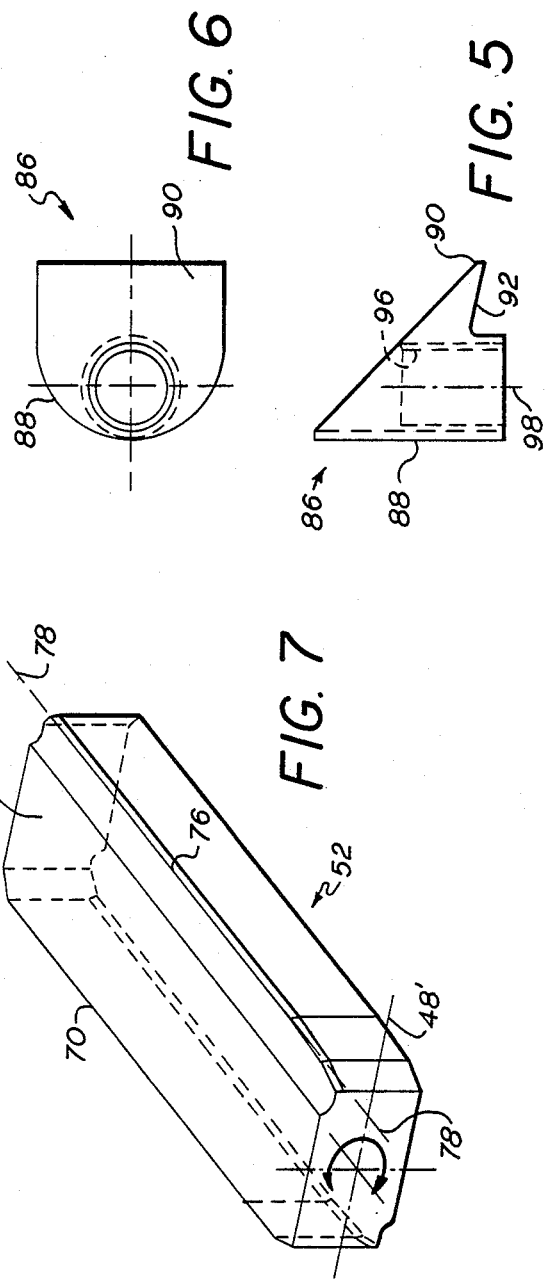
FIG. 1
FIG. 5
FIG. 6
FIG. 7

ROTARY CUTTING TOOL

BACKGROUND OF THE INVENTION

1. Field of the Invention

The present invention relates to a rotary cutting tool having a finitely adjustable and replaceable cutting insert. The tool described herein is in the form of a reamer but other uses will be readily apparent to those skilled in the art.

2. Description of the Prior Art

Rotary cutting tools having cutting inserts which are adjustable and replaceable are known in the art. Examples are described in U.S. Pat. Nos. 4,125,342 and 4,279,550. It is desirable to provide an improved rotary cutting tool of the type described in these patents. To this end it is desired to provide a rotary cutting tool wherein a pair of guide pads are spaced a sufficient degree to provide a tool having improved stability during use. It is also desirable to provide such a tool wherein various structural features are positioned to provide ease of manufacture and convenience of insert adjustment. It is further desirable to provide such a tool wherein finite radial adjustment of the cutting insert is possible. It is also desirable to provide such a tool wherein there is an improved clamping of the cutting insert.

SUMMARY OF THE INVENTION

The invention achieves these and other results by providing a rotary cutting tool comprising a holder which is elongated and generally cylindrical and to which can be attached a cutting insert. The holder includes a longitudinal axis and when viewed in axial cross section includes a vertical axis perpendicular to a horizontal axis. One end of the holder includes a recessed area including a first surface formed by the removal of a segment of the holder generally defined in axial cross section by an arc and chord of the holder. A first recess extends in an axial direction and into the holder from the periphery thereof. When viewing the holder in axial cross section the first recess is located at a first radius of the holder which is coincident with the vertical axis. A second recess extends in an axial direction and into the holder from the periphery thereof. When viewing the holder in axial cross section the second recess is located at a second radius of the holder which forms a first angle with the first radius. A first threaded aperture extends into the holder from the first surface along a first axis which is spaced from and parallel to the horizontal axis. A second threaded aperture extends into the holder from the first surface along a second axis which is spaced in an axial direction from the first axis and spaced from and parallel to the horizontal axis and the first axis. A third threaded aperture extends into the holder along a third axis which is parallel to the first and second axis. A third recess extends into the holder from the periphery thereof along a fourth axis which forms a second angle with the vertical axis and which is spaced about 180° C. from the first radius. A first guide pad is positioned within the first recess and includes a first guide surface extending therefrom. The first guide pad includes a first vertical axis which is coincident with the first radius. A second guide pad is positioned within the second recess and includes a second guide surface extending therefrom. The second guide pad includes a second vertical axis which is coincident with the second radius. A first adjusting screw is threaded into the first threaded aperture and includes a first camming surface for engaging a corresponding camming surface of the cutting insert. A second adjusting screw is threaded into the second threaded aperture and includes a second camming surface for engaging such corresponding camming surface of the cutting insert. A clamping screw is threaded into the third threaded aperture. Means is attached to the elongated holder by the clamping screw for holding the cutting insert within the third recess such that a cutting edge of the cutting insert will extend along a third axis which is parallel to the longitudinal axis of the holder and is spaced about 180° C. from the first radius.

BRIEF DESCRIPTION OF THE DRAWINGS

FIG. 1 is a side elevation view of one embodiment of the present invention;

FIG. 5 is a side view of a clamping member of the present invention;

FIG. 6 is a plan view of FIG. 5;

FIG. 7 is an elevation view of a cutting insert for use with the present invention; and, FIG. 8 is a diagrammatic view of an adjusting screw of the present invention.

DESCRIPTION OF THE PREFERRED EMBODIMENT

Figure 2:
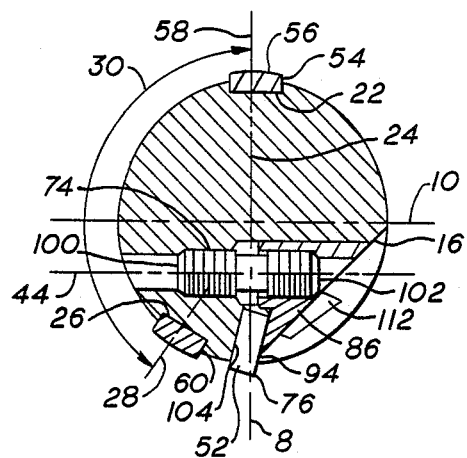
FIG. 2 is a sectional view of FIG. 1 taken along lines 2—2.

The embodiment which is illustrated in the drawings is particularly suited for achieving the objects of this invention. FIGS. 1 to 4 depict a rotary cutting tool 2 comprising a holder 4 which is in the form of an elongated and generally cylindrical tool shank having a longitudinal axis 6. When viewed in axial cross section as in FIGS. 2 and 3, the holder 4 includes a vertical axis 8 which is perpendicular to a horizontal axis 10, axes 8 and 10 intersecting at the longitudinal axis 6. One end 12 of the holder 4 includes a recessed area 14 including a first surface 16 formed by the removal of a segment of the holder 4 generally defined in axial cross section by an arc and chord of the holder.

Figure 3:
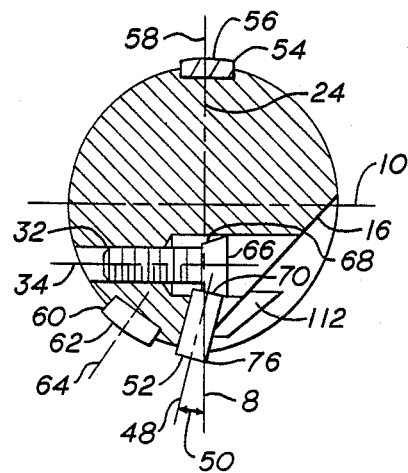
FIG. 3 is a sectional view of FIG. 1 taken along lines 3—3.

A first recess 22 is provided extending in an axial direction. Recess 22 extends into the holder 4 from the periphery thereof. When viewing the holder in axial cross section as depicted in FIGS. 2 and 3, the first recess 22 is located at a first radius 24 of the holder which is coincident with the vertical axis 8. A second recess 26 is also provided extending in an axial direction. Second recess 26 extends into the holder 4 from the periphery thereof. When viewing the holder 4 in an axial cross section, the second recess is located at a second radius 28 of the holder which forms an angle 30 with the first radius 24. In the embodiment of FIGS. 1 to 4, angle 30 is about 145° C.

Figure 4:
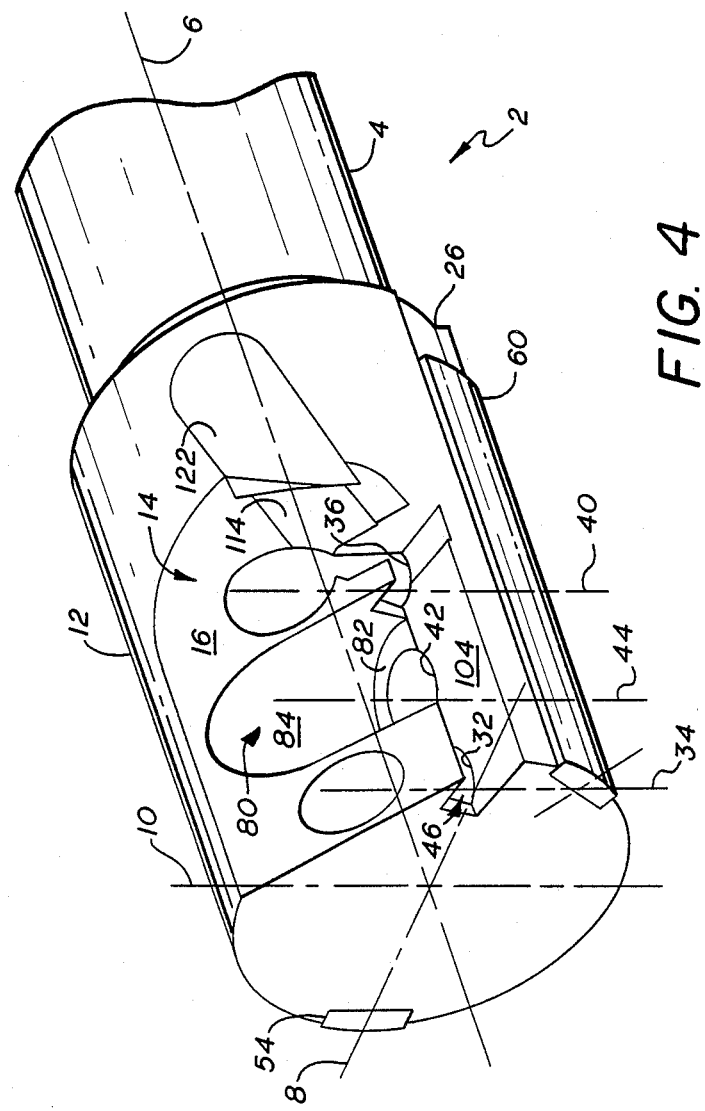
FIG. 4 is an enlarged side elevation view of the embodiment of FIG. 1 with various structural features removed for clarity.

A first threaded aperture 32 is provided extending into holder 4 from the surface 16 along a first axis 34 which is spaced from and parallel to the horizontal axis 10 as depicted in FIG. 4. In a like manner, a second threaded aperture 36 is provided extending into holder 4 from the surface 16 along a second axis 40 which is spaced in an axial direction from the first axis 34 as depicted in FIG. 4. Second axis 40 is also spaced from and parallel to horizontal axis 10 and first axis 34. A third threaded aperture 42 is provided extending into holder 4 along a third axis 44 which is parallel to the first axis 34 and second axis 40.

A third recess 46 is provided extending into holder 4 from the periphery thereof along a fourth axis 48 which forms a second angle 50 with the vertical axis 8 and which is spaced about 180° C. from the first radius 24. When the cutting insert 52 of FIG. 7 is attached to the holder 4 as described herein, the horizontal axis 48' of the insert 52 will be coincident with axis 48.

A first guide pad 54 is positioned within the first recess 22. First guide pad 54 includes a first guide surface 56 which extends from recess 22 and also includes a first vertical axis 58 which is coincident with the first radius 24. A similar second guide pad 60 is positioned within the second recess 26. Second guide pad 60 includes a second guide surface 62 which extends from recess 26 and also includes a second vertical axis 64 which is coincident with the second radius 28. In the embodiment of FIGS. 1 to 4 the pads 54 and 60 are spaced an amount identified as angle 30 which is about 145° C. Such spacing contributes to improved stability during use of the tool compared to other known prior art where pad spacing is closer together.

Figure 8:
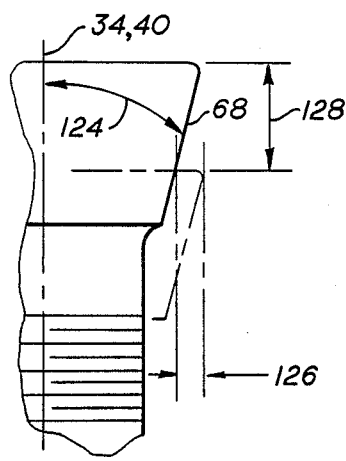

A first adjusting screw 66 of the type depicted in FIG. 8 is threaded into the first threaded aperture 32. Screw 66 includes a camming surface 68 for engaging a corresponding camming surface 70 of the cutting insert 52. A similar second adjusting screw 72 is threaded into the second threaded aperture 36. Screw 72 includes a camming surface (not shown), similar to camming surface 68, for engaging camming surface 70 of the cutting insert 52.

In addition to the adjusting screws 66 and 72, a clamping screw 74 is threaded into the third threaded aperture 42. Means is attached to the elongated holder by the clamping screw 74 for holding the cutting insert 52 within the third recess 46 such that a cutting edge 76 of the insert will (a) extend along a third axis 78 which is parallel to the longitudinal axis 6; and, (b) be spaced about 180° C. from the first radius 24. Axis 78 is superimposed upon insert 52 in FIG. 7. In viewing FIGS. 2 and 3, axis 78 extends perpendicular to the plane of the paper upon which FIGS. 2 and 3 are drawn.

In the preferred embodiment the rotary cutting tool includes a fourth recess 80 which extends into the holder 4 from the first surface 16 along the third axis 44 to a second surface 82. A third surface 84 extends from the second surface 82 to the first surface 16. In such embodiment, the third threaded aperture 42 extends into the holder from the second surface 82. In the embodiment of FIGS. 1 to 4, the holding means includes a clamping member 86 which fits into the fourth recess 80. Referring to FIGS. 5 and 6, the clamping member 86 includes a fourth surface 88 which engages the third surface 84 of the holder for sliding movement relative thereto. Clamping member 86 includes a lip 90 which includes a fifth surface 92 which will engage and be parallel to an upper surface 94 of the cutting insert 52, upper surface 94 being adjacent the camming surface 70. The clamping member 86 includes a fourth threaded aperture 96 extending therethrough and parallel to the fourth surface 88. Aperture 96 has a fifth axis 98 which is coincident with the third axis 44.

In the preferred embodiment, the clamping screw 74 is threaded in a first direction at one end 100 which is threaded into the third threaded aperture 42 and is threaded in an opposite second direction at an opposite end 102 which is threaded into the fourth threaded aperture 96. As depicted in FIG. 4, the third axis 44 can be located between the first axis 34 and the second axis 40 when viewed in the horizontal direction. In addition, the third axis 44 is depicted in FIG. 1 as being intermediate of, on the one hand, the first axis 34 and second axis 40, and on the other hand the horizontal axis 6, when viewed in the vertical direction.

In the preferred embodiment the third recess 46 includes a cutting insert support surface 104 which is parallel to the fifth surface 92 of the clamping member 86 and the upper surface 94 of the insert 52.

In the embodiment of FIGS. 1 to 4 the holder 4 includes a first bore 106 extending along the longitudinal axis 6 from an end 108 opposite of end 12 to a position generally designated 110 in the vicinity of the recessed area 14. A first channel 112 is provided at the periphery of the holder 4 in the vicinity of the first recess 22. A second channel 114 is provided at the periphery of the holder extending into the recessed area 14. A second bore 116 extends from the first bore 106 to the first channel 112 and a third bore 118 extends from the first bore 106 to the second channel 114. During use of the rotary cutting tool a fluid such as water is caused to flow through bore 106, then through bores 116 and 118, and along channels 112 and 114. The channels 112 and 114 include a cover plate 120 and 122, respectively, to divert the fluid along each respective channel.

In order to mount a cutting insert 52 to a holder 4, the clamping screw 74 is loosened to loosen the clamping member 86. Insert 52 is then inserted into recess 46 such that the insert rests upon surface 104 and the camming surface 70 engages the camming surfaces 68 of the adjusting screws 66 and 72. When in this portion, the clamping screw 74 is tightened to tighten the clamping member 86 such that the surface 92 of the clamping member firmly engages the upper surface 94 of the insert. Outward radial adjustment of the insert can be effected by screwing the adjusting screws 66 and 72 inward to the extent desired to cause the surfaces 68 of the adjusting screws to effect a camming action against the surface 70 of the insert to move the insert in a radial direction outward. The insert can be moved radially inward by screwing the adjusting screws 66 and 72 outward to the extent desired to cause the surfaces 68 to disengage the surface 70 of the insert. The insert can then be pushed inward by hand until the surface 70 of the insert once again engages the surfaces 68 of the adjusting screws 66 and 72. In such structure, the axes of the clamping screw and adjusting screws are parallel to each other and to a horizontal axis of the holder. Such structure provides ease of manufacture and convenience of insert adjustment. In addition, by providing adjusting screws which are screwed generally inwards towards the insert top surface 94 to cause outward radial movement, the engagement of the camming surfaces of the adjusting screws with the camming surface of the insert contribute to firmly holding the insert in place. In a preferred embodiment of FIG. 8, an adjusting screw is depicted superimposed upon an axis 34 or 40, as the case may be. In such embodiment the camming surface 68 extends at an angle 124 of 14° C. relative to the axis 34 or 40. In this embodiment minute radial adjustment can be effected in that small incremental radial movements within the dimension generally designated 126 can be effected through a much larger axial movement generally designated 128. In particular, in such embodiment, the radial adjustment 126 is equal to ¼ of the axial adjustment 128 which provides for very finite adjustment.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. A rotary cutting tool, comprising:
   a holder which is elongated and generally cylindrical and to which can be attached a cutting insert, said holder having a longitudinal axis, and in axial cross section having a vertical axis perpendicular to a horizontal axis, one end of said holder having a recessed area including a first surface formed by the removal of a segment of said holder generally defined in axial cross section by an arc and chord of said holder;
   a first recess extending in an axial direction and into said holder from the periphery thereof, when viewing said holder in axial cross section said first recess being located at a first radius of said holder which is coincident with said vertical axis;
   a second recess extending in an axial direction and into said holder from the periphery thereof, when viewing said holder in axial cross section said second recess being located at a second radius of said holder which forms a first angle with said first radius;
   a first threaded aperture extending into said holder from said first surface along a first axis which is spaced from and parallel to said horizontal axis;
   a second threaded aperture extending into said holder from said first surface along a second axis which is spaced in an axial direction from said first axis and spaced from and parallel to said horizontal axis and said first axis;
   a third threaded aperture extending into said holder along a third axis which is parallel to said first and second axis;
   a third recess extending into said holder from the periphery thereof along a fourth axis which forms a second angle with said vertical axis and which is spaced about 180° C. from said first radius;
   a first guide pad positioned within said first recess and having a first guide surface extending therefrom, said first guide pad having a first vertical axis which is coincident with said first radius;
   a second guide pad positioned within second recess and having a second guide surface extending therefrom, said second guide pad having a second vertical axis which is coincident with said second radius;
   a first adjusting screw threaded into said first threaded aperture and having a first camming surface for engaging a corresponding camming surface of said cutting insert;
   a second adjusting screw threaded into said second threaded aperture and having a second camming surface for engaging said corresponding camming surface of said cutting insert;
   a clamping screw threaded into said third threaded aperture; and,
   means attached to said elongated holder by said clamping screw for holding said cutting insert within said third recess such that a cutting edge of said cutting insert will extend along a fifth axis which is (a) parallel to said longitudinal axis and (b) spaced about 180° C. from said first radius.

2. The rotary cutting tool of claim 1 further including a fourth recess extending into said holder from said first surface along said third axis to a second surface and having a third surface extending from said second surface to said first surface, and wherein said third threaded aperture extends into said holder from said second surface.

3. The rotary cutting tool of claim 2 wherein said holding means includes a clamping member which fits into said fourth recess and comprises (a) a fourth surface which engages said third surface for sliding movement relative thereto and (b) a lip which includes a fifth surface which will engage and be parallel to an upper surface of said cutting insert, said upper surface being adjacent said corresponding camming surface.

4. The rotary cutting tool of claim 3 wherein said clamping member includes a fourth threaded aperture extending therethrough and parallel to said fourth surface, said fourth threaded aperture having a sixth axis which is coincident with said third axis.

5. The rotary cutting tool of claim 4 wherein said clamping screw is threaded in a first direction at one end which is threaded into said third threaded aperture and is threaded in an opposite second direction at an opposite end which is threaded into said fourth threaded aperture.

6. The rotary cutting tool of claim 5 wherein said third axis is located between said first and second axis.

7. The rotary cutting tool of claim 6 wherein said third axis is intermediate of, on the one hand said first and second axes, and on the other hand said horizontal axis.

8. The rotary cutting tool of claim 7 wherein said third recess includes a cutting insert support surface which is parallel to said fifth surface.

9. The rotary cutting tool of claim 8 wherein said first camming surface extends at an angle of 14° C. relative to said first axis and said second camming surface extends at an angle of 14° C. relative to said second axis.

10. The rotary cutting tool of claim 9 wherein said holder includes a first bore extending along said longitudinal axis from an end opposite said one end to a portion in the vicinity of said recessed area, a first channel at the periphery of said holder in the vicinity of said first recess, a second channel at the periphery of said holder in the vicinity of and extending into said recessed area, a second bore extending from said first bore to said first channel, and a third bore extending from said first bore to said second channel.

* * * * *